United States Patent
Lin et al.

(10) Patent No.: US 10,659,384 B2
(45) Date of Patent: May 19, 2020

(54) BANDWIDTH MANAGEMENT METHOD FOR NETWORK SWITCH AND NETWORK SYSTEM THEREOF

(71) Applicant: ESTINET TECHNOLOGIES INC., Hsinchu (TW)

(72) Inventors: Chih-Che Lin, Hsinchu (TW); Chien-Hsin Chen, Tainan (TW)

(73) Assignee: ESTINET TECHNOLOGIES INC., Hsinchu (TW)

( * ) Notice: Subject to any disclaimer, the term of this patent is extended or adjusted under 35 U.S.C. 154(b) by 3 days.

(21) Appl. No.: 16/107,260

(22) Filed: Aug. 21, 2018

(65) Prior Publication Data

US 2019/0222531 A1    Jul. 18, 2019

(30) Foreign Application Priority Data

Jan. 15, 2018  (TW) ............................. 107101416 A

(51) Int. Cl.
*H04L 12/865* (2013.01)
*H04L 12/24* (2006.01)
(Continued)

(52) U.S. Cl.
CPC ...... *H04L 47/6275* (2013.01); *H04L 41/0896* (2013.01); *H04L 41/5022* (2013.01);
(Continued)

(58) Field of Classification Search
CPC ..... H04L 12/24; H04L 12/801; H04L 12/865; H04L 12/873; H04L 12/911;
(Continued)

(56) References Cited

U.S. PATENT DOCUMENTS 5,983,278 A * 11/1999 Chong ................ H04L 12/5602
370/414
7,061,861 B1 * 6/2006 Mekkittikul ........ H04L 12/2852
370/230
(Continued)

FOREIGN PATENT DOCUMENTS

CN         102413054 B       9/2014

*Primary Examiner* — Tri H Phan
(74) *Attorney, Agent, or Firm* — Li & Cai Intellectual Property (USA) Office

(57) ABSTRACT

The disclosure is related to a bandwidth management method performed in a network switch and a network system. In the method, a total bandwidth usage is firstly metered, and it is determined if the total bandwidth usage reaches a threshold for triggering a flow-limit process. This threshold acts as a bandwidth-usage threshold obtained by multiplying a total bandwidth by a meter-triggering threshold. The flow-limit process is triggered if the total bandwidth usage reaches the threshold; otherwise, the system will not intervene with the usage of bandwidth if the total bandwidth usage does not reach the threshold. In the flow-limit process, the class of a user is identified. Guaranteed bandwidth is provided for a prioritized user. A normal user will be restricted to using the bandwidth aside from the guaranteed bandwidth. The bandwidth provided for the normal user may exceed the available bandwidth based on an adjustable system parameter.

14 Claims, 5 Drawing Sheets

(51) Int. Cl.
*H04L 12/801* (2013.01)
*H04L 12/927* (2013.01)
*H04L 12/26* (2006.01)
*H04L 12/721* (2013.01)

(52) U.S. Cl.
CPC ........ *H04L 43/026* (2013.01); *H04L 43/0888* (2013.01); *H04L 47/11* (2013.01); *H04L 47/805* (2013.01); *H04L 43/0894* (2013.01); *H04L 43/16* (2013.01); *H04L 45/38* (2013.01)

(58) Field of Classification Search
CPC ............... H04L 12/927; H04L 41/0896; H04L 41/5022; H04L 43/026; H04L 43/0888; H04L 43/0894; H04L 43/16; H04L 45/38; H04L 47/805; H04L 47/6275; H04L 12/825; H04L 12/833; H04L 12/835; H04L 12/905; H04L 41/00; H04L 43/00; H04L 47/00; H04L 47/10–12; H04L 47/24–25; H04L 47/29–30; H04L 47/2408; H04L 49/50; H04L 49/90; H04L 49/503

See application file for complete search history.

(56) References Cited

U.S. PATENT DOCUMENTS

| | | | | |
|---|---|---|---|---|
| 7,835,395 | B2* | 11/2010 | Okita | H04L 12/2854 370/231 |
| 8,254,252 | B2* | 8/2012 | Hinosugi | H04L 47/10 370/229 |
| 8,811,184 | B2* | 8/2014 | Ong | H04L 41/0896 370/237 |
| 9,054,996 | B2* | 6/2015 | Voruganti | H04L 47/12 |
| 9,450,884 | B2* | 9/2016 | Hwang | H04L 47/12 |
| 9,479,341 | B2* | 10/2016 | Bugenhagen | H04L 12/14 |
| 9,674,042 | B2* | 6/2017 | Lissack | H04L 43/0817 |
| 9,800,483 | B2* | 10/2017 | Williams | H04L 43/0882 |
| 2012/0108200 | A1 | 5/2012 | Rubin et al. | |

\* cited by examiner

BANDWIDTH MANAGEMENT METHOD FOR NETWORK SWITCH AND NETWORK SYSTEM THEREOF

BACKGROUND OF THE INVENTION

1. Field of the Invention

The disclosure is related to a method and a system for bandwidth management, and in particular to a method for bandwidth management of a network switch based on user classes and a network system thereof.

2. Description of Related Art

A traditional network is deployed with limited link bandwidth. Management of a traditional network is usually done in a distributed manner, which means that setting up a network is in device-by-device manner. This way, it is difficult to set up the QoS of a network based on the priority and the bandwidth need of a network flow. Therefore, the traditional network system may allow network packets from a variety of applications with different priorities share the same link and the same limited bandwidth. This would cause prioritized services in the network not to obtain sufficient bandwidth for matching their bandwidth needs guaranteed by the network.

Conventional technology such as a Quality of Service (QoS) can be used to manage bandwidth usages with respect to different flows. QoS guarantees some specific applications (with specific communication ports) to acquire sufficient bandwidth. QoS also allows part of the applications to use unused bandwidth without limitation or within a certain tolerance range, so that unused bandwidth can be properly and dynamically utilized.

According to a general QoS operation, a software procedure is performed to identify and differentiate application-layer packets based on the contents of packets. Bandwidth can then be allocated for specific applications. QoS operations, however, generally require advanced high-performance hardware and intervention of human intelligence due to the complexity of calculation of resource allocation for a network.

SUMMARY OF THE INVENTION

The disclosure is related to a bandwidth management method for a network switch, and a network system implementing the method. The network switch can be a Software-Defined Network (SDN) switch. The method can be operated in an SDN controller associated with the SDN switch. One of the objectives of the method is to dynamically adjust bandwidth provided for the different classes of users according to the currently metered bandwidth.

In one of the embodiments of the bandwidth management method, a total bandwidth is provided by the network system for the users who are categorized into prioritized users and normal users. The system provides every prioritized user with a guaranteed bandwidth. In the method, it is determined if a total bandwidth usage reaches a threshold for triggering a flow-limit process by metering the total bandwidth usage. If the total bandwidth usage reaches the threshold, the flow-limit process is performed. The flow-limit process provides a guaranteed bandwidth or a limited bandwidth for users who are identified as prioritized users or normal users. However, if the total bandwidth usage does not exceed the threshold for triggering the flow-limit process, the system will not intervene with usage of the bandwidth.

If a user is identified as a prioritized user, a guaranteed bandwidth is provided; otherwise, a "normal user flow-limit policy" is applied to a normal user. The normal user will be restricted to using the bandwidth aside from the guaranteed bandwidth for prioritized users.

In one embodiment, the threshold for triggering the flow-limit process is a bandwidth-usage threshold that is equal to a total bandwidth multiplied by a meter-triggering threshold. The meter-triggering threshold is preferably a value smaller than 1 that allows the system to be operated within a safety range.

In one further embodiment, the system applies a normal user flow-limit policy to a normal user. This policy allows the normal user to use an excess available bandwidth. The excess available bandwidth is equal to the normal user's available bandwidth multiplied by a Bandwidth Flexibility Ratio. It should be noted that the available bandwidth is calculated by the system, and the Bandwidth Flexibility Ratio is preferably larger than 1.

The network system that operates the bandwidth management method includes a network switch. The bandwidth management can be performed in the network switch.

The network switch can be a Software-Defined Network (SDN) switch. The bandwidth management method can alternatively be performed in a SDN controller. Each of the SDN switches serves network flows within a wireless LAN through one or more APs. Through the switch and its connected one or more APs, the system provides a guaranteed bandwidth or a limited bandwidth for a terminal device that roams over the network at different locations.

DETAILED DESCRIPTION OF THE PREFERRED EMBODIMENTS

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure is related to a bandwidth management method performed in a network switch and a system implementing the method. One objective of the method is to provide different bandwidth restriction schemes for different prioritized classes of users. A network switch includes a database that records classes of the users, e.g. the prioritized users and the normal users, and priority, numbers and guaranteed bandwidths for the different classes of users. Thus, a software process performed in the network switch acquires metering information from different switches in order to calculate the flow rate. The different classes of users are accordingly provided with the limited bandwidth or guaranteed bandwidth.

Figure 1:
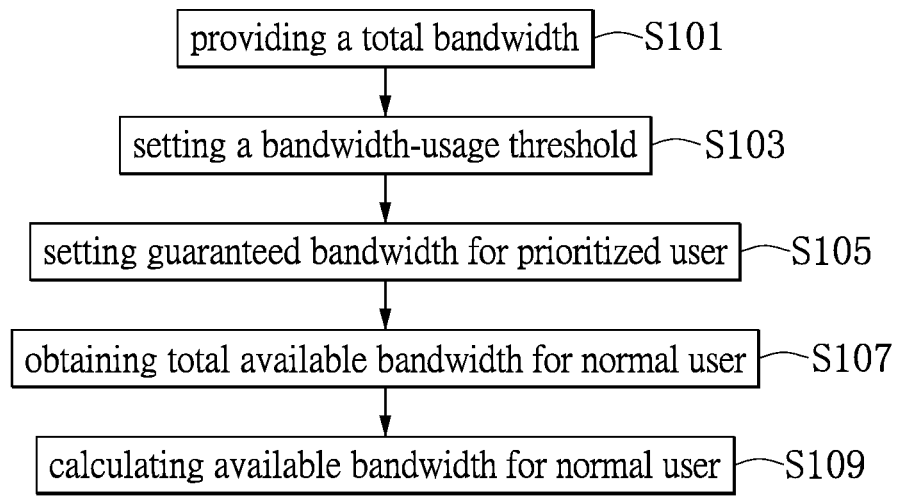
FIG. 1 depicts an operating process before a bandwidth management method is performed.

The software process performed in the network switch has a metering algorithm which is an on-demand metering algorithm that embodies a pre-operation for the bandwidth management. FIG. 1 shows a flow chart describing the pre-operation of the bandwidth management method in the network switch according to one embodiment of the disclosure.

Step S101: in an initial process of the network system, a total bandwidth (W) is provided. 'W' represents a transmission rate (bps) of a WAN port and indicates a total bandwidth for the users.

Step S103: a bandwidth-usage threshold is set to trigger a flow-limit process, and this threshold for triggering the flow-limit process is equal to a total bandwidth multiplied by a meter-triggering threshold (OMTT*W). OMTT (On-demand Meter Triggering Threshold) refers to a meter-triggering threshold that acts as a threshold for triggering the flow-limit process. When the bandwidth is sufficient for the users, it is not necessary to trigger the flow-limit process. The flow-limit will be activated when the usage of bandwidth reaches the threshold. The flow-limit process can change the bandwidth usage distribution of the flows for the users in order to guarantee the bandwidth for the prioritized users. For example, OMTT=0.85 denotes a proportion (85%) of the meter-triggering threshold to the total bandwidth. The flow-limit process is triggered if the usage of total bandwidth exceeds the meter-triggering threshold.

Step S105: one or more prioritized users and one or more normal users are designated in the network system. The network system provides a guaranteed bandwidth for every prioritized user. For example, the mathematical relationship between the prioritized users and their corresponding guaranteed bandwidths can be expressed as: $A=V_1$, $B=V_2$, $C=V_3$, $D=V_4$ and $E=V_5$, in which $V_i$ denotes the guaranteed bandwidth for one of the prioritized users, and 'i' represents an indexing number for a prioritized user. $N_{pu}$ denotes the total number of prioritized users. If the network system guarantees five prioritized users A, B, C, D and E to have their guaranteed bandwidths $V_1$, $V_2$, $V_3$, $V_4$ and $V_5$ that are the same value or different values, $N_{pu}=5$.

Step S107: the bandwidth-usage threshold (OMTT*W) for triggering the flow-limit process subtracts the guaranteed bandwidth (Sum($V_1$, $V_2$, $V_3$, $V_4$, $V_5$)) for the prioritized user(s), and a difference thereof indicates the normal user's total available bandwidth.

Step S109: the difference is multiplied by the Bandwidth Flexibility Ratio (BFR) for obtaining an excess bandwidth for the normal user(s).

$$M_s=\{OMTT*W-\text{Sum}(V_1, V_2, V_3, V_4, V_5)\}*BFR \quad \text{formula (1).}$$

The acronym 'BFR' stands for Bandwidth Flexibility Ratio that is generally configured to be, but not limited to, between 1.0 and 3.0. 'BFR' is used to determine whether the normal users are permitted to overuse their limited bandwidths. If the total bandwidth is sufficient, the network system permits the normal users to overuse their bandwidth. It should be noted that the 'BFR' is preferably a value larger than and equal to 1, and may be within a range of 1.0 to 3.0, for example, 1.2.

FIG. 1 shows a flow chart depicting a policy in which the system provides the prioritized user with a guaranteed bandwidth and the normal user with an available bandwidth ($M_s$) before the system is in operation. It should be noted that the available bandwidth ($M_s$) can exceed a limited bandwidth originally provided for the normal user. This policy allows the normal user to utilize the bandwidth exceeding his assigned bandwidth so the network system would more efficiently utilize the unused bandwidth. Under this mechanism with adjustable system parameters, in one embodiment, the available bandwidth for the normal user is multiplied by the Bandwidth Flexibility Ratio (BFR) for obtaining the excess bandwidth provided for the normal user. The Bandwidth Flexibility Ratio is a coefficient used to allow the available bandwidth to be utilized in more aggressive manner. BFR allows the normal user to use the excess bandwidth. The excess bandwidth is the available actual bandwidth provided for the normal user; on the other hand, the excess bandwidth also acts as an upper bandwidth limit for the normal user.

A flow-limit process is performed to guarantee a bandwidth for the prioritized user but limit the bandwidth provided for the normal user while the system switch operates a method for bandwidth management. In an exemplary example, a suppression period (e.g. 20 seconds) is introduced for the system to detect the flow rate within a period of time, and to re-evaluate the flow-limit. When the bandwidth is sufficient, the system does not intervene with the bandwidth usage. The system is required to guarantee the prioritized user bandwidth by altering the flow distribution only if the total bandwidth is insufficient.

Figure 2:
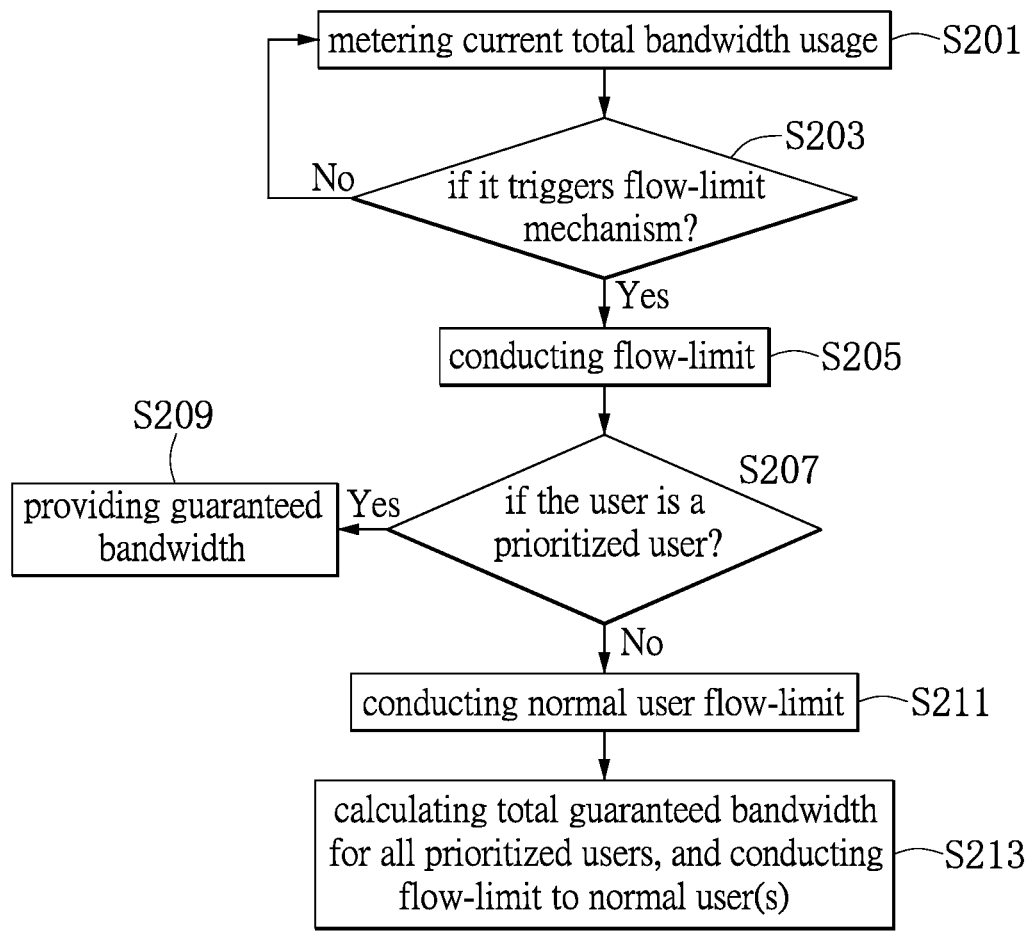
FIG. 2 shows a flow chart illustrating the bandwidth management method in one embodiment of the disclosure.

After that, in the network switch, a guaranteed bandwidth is applied to every prioritized user, and an available bandwidth ($M_s$) is provided for every normal user. The network switch is such as a Software-Defined Networks (SDN) switch that implements the bandwidth management method. Reference is next made to FIG. 2, which shows a flow chart of the method in the embodiment of the disclosure.

In the initial step of S201, which is the pre-processing operation for setting up the guaranteed bandwidth for the prioritized user and flow-limit for the normal user, a software procedure operated in the network switch first meters a current total bandwidth usage (T). In the next step of S203, the software procedure is configured to determine if the total bandwidth usage (T) reaches a threshold for triggering the flow-limit process.

It is not necessary for the switch to conduct flow-limit if the total bandwidth usage (T) does not reach the threshold for triggering the flow-limit process. The system therefore maintains the present situation without intervening with the bandwidth usage. The step S201 may be periodically performed to continuously meter the current total bandwidth usage (T). Otherwise, a flow-limit process will be activated, in step S205, if the total bandwidth usage (T) reaches (e.g. larger than or equal to) the threshold for triggering the flow-limit process.

In step S205, during the flow-limit process, the system can identify the user class of a user joining the network according to the information extracted from the packets. The information for identifying the user class is such as an IP address or a MAC address. The system accordingly determines if the user is a prioritized user by a software procedure operated in the network switch, such as in step S207.

If the user is a prioritized user, such as in step S209, the system provides a guaranteed bandwidth. If the user is a normal user, namely not one of the prioritized users, a "normal user flow-limit policy" is applied to the user, such as in step S211. The system performs QoS by a bandwidth slicing process according to the user class. The system also conducts a total flow control, such as in step S213, including adding up all the guaranteed bandwidths for all the prioritized users, and the rest of the normal users will be restricted to using the bandwidth aside from the total guaranteed bandwidths for the prioritized users.

Further, the bandwidth management method introduces some parameters such as a meter-triggering threshold (OMTT) and a Bandwidth Flexibility Ratio (BFR) according to one further embodiment of the disclosure.

In step S203, it is determined if a total bandwidth usage T exceeds the threshold for triggering flow-limit process by comparing the total bandwidth usage T with a bandwidth-usage threshold (OMTT*W). The meter-triggering threshold (OMTT) is introduced to be multiplied by the total bandwidth (W) so as to obtain the bandwidth-usage threshold (OMTT*W). The meter-triggering threshold is generally set to be smaller than 1, which allows the total utilized bandwidth to be operated under safe traffic.

In one embodiment, when the system conducts flow-limit to the normal users, it adopts an aspect of available bandwidth ($M_s$) that introduces the BFR to the formula (1). The Bandwidth Flexibility Ratio (BFR) allows the system to provide the available bandwidth $M_s$ that exceeds the original bandwidth for the normal user.

In one further embodiment, such as the steps after step S211, an aspect of periodic flow suppression is used for periodically allowing the normal user to use the available bandwidth ($M_s$) that exceeds his original limited bandwidth by periodic flow detection. The total available bandwidth multiplied by the Bandwidth Flexibility Ratio (BFR) obtains an actual available bandwidth for the normal user. After that, for avoiding network traffic congestion, the system returns to the flow-limit mode.

Figure 3:
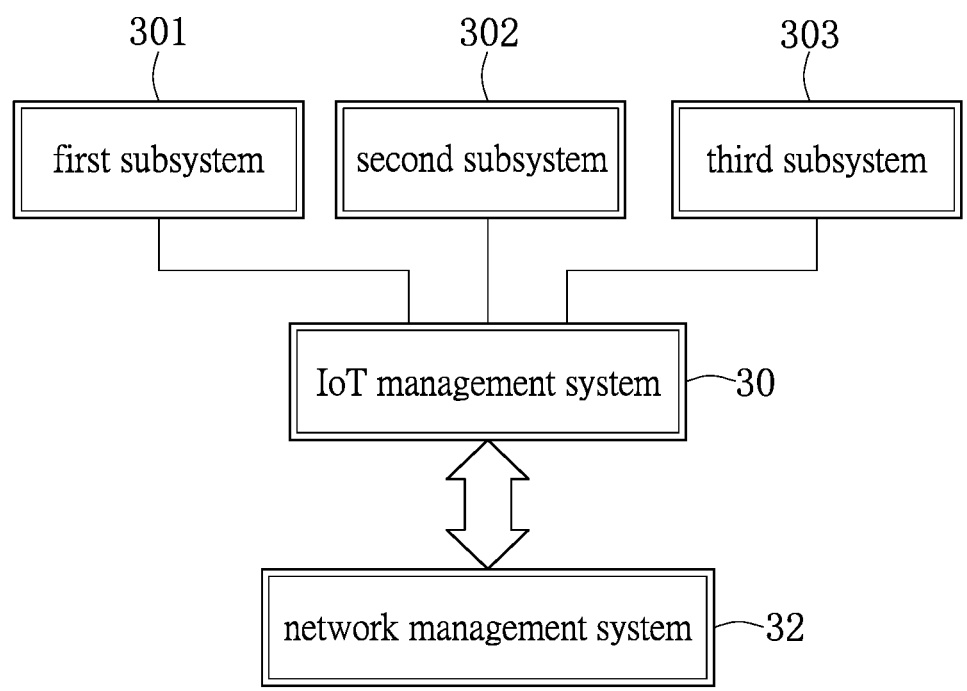
FIG. 3 shows a schematic diagram of an IoT network system in one embodiment of the disclosure.

The bandwidth management method of the disclosure can be applied to the network switch. FIG. 3 shows a schematic diagram depicting an IoT network system in one embodiment of the disclosure.

An IoT system is shown in the diagram. An IoT management system 30 is provided for connecting with an access point (AP) of a subsystem. For example, the IoT management system 30 connects with subsystems such as a first subsystem 301, a second subsystem 302 and a third subsystem 303 via wireless or wired flows. Each subsystem connects with one or more IoT endpoints.

For example, the first subsystem 301 can be a monitoring subsystem that is used to monitor the bandwidth usage of each IoT endpoint. The second subsystem 302 can be a dynamic bandwidth management subsystem that dynamically manages the bandwidth provided for the IoT endpoint according to its bandwidth usage. The third subsyste 303 can be a flow-policy control subsystem that is able to provide different levels of bandwidths based on attributes of the various IoT endpoints. A high-priority IoT endpoint can use its guaranteed bandwidth, or have the privilege to exclude other endpoints. An IoT endpoint with lower priority is restricted by an upper limit of bandwidth provided by the system.

The IoT management system 30 connects with a network management system 32. The network management system 32 operates the bandwidth management method through its server or a specific host. The network management system 32 can acknowledge the priority level of each IoT endpoint through the IoT management system 30 and accordingly identify the prioritized users and the normal users of the system. The different IoT endpoints can have different network bandwidth requirements. For example, the bandwidths provided for services such as video communications, security messages and instant messaging shall be guaranteed, and these services can be prioritized as the prioritized users. Otherwise, other services such as applications without instant communication needs or transmission reliability needs are regarded as normal users without guaranteed bandwidth. These applications will be limited to use the rest bandwidth other than the guaranteed bandwidth provided for the prioritized users.

The network management system 32 has a network switch that performs the bandwidth management method including the pre-processing operations described in FIG. 1. The pre-processing operations include setting a bandwidth-usage threshold and a guaranteed bandwidth for the prioritized users, and calculating the available bandwidth for the normal users. Reference is further made to FIG. 2, showing a flow chart describing the bandwidth management method according to one embodiment of the disclosure.

In the method, it determines whether or not a flow-limit process is triggered according to a total bandwidth usage. If the total bandwidth usage does not meet the condition for triggering the flow-limit process, the original work goes on, and the system continuously meters the total bandwidth usage. If the total bandwidth usage meets the condition for triggering the flow-limit process, the flow-limit process is performed to guarantee the bandwidth for the prioritized users and control the bandwidth provided for the normal users. This flow-limit mechanism allows the IoT management system 30 to control bandwidth for each IoT endpoint.

The network switch operating the bandwidth management method is such as a SDN switch that may be a Legacy & SDN Hybrid Switch. The Software-Defined Network utilizes a centralized controller to replace the control plane of conventional switch used in a distributed network system. The SDN mechanism allows the SDN switch to be in charge of data-plane forwarding only. The centralized controller in SDN can therefore achieve optimized control. Thus, when the bandwidth management method is operated in the SDN network, the SDN controller will be activated to be in charge of operating the method. The SDN controller communicates with the SDN switch(es) through an OpenFlow protocol. The SDN controller is able to meter and limit the flow passing the SDN switch. For example, the SDN controller executes a "normal user flow-limit policy" when triggering the flow-limit process.

In addition to the disclosed embodiment above, where the bandwidth management method can be operated in the IoT access point or the SDN switch, the bandwidth management method is also applicable to a network environment that classifies the users into prioritized users and normal users. For example, the bandwidth management method can be implemented in a campus network system and can be integrated with a DHCP (Dynamic Host Configuration Protocol) server or a RADIUS (Remote Authentication Dial In User Service) server. Furthermore, the campus network system classifies the teachers and students into prioritized users who can have a guaranteed bandwidth, and normal users. The aforementioned Bandwidth Flexibility Ratio (BFR) is a flexible coefficient that can allow the students to use excessive bandwidth. A software procedure executed in the network management system 32 performs metering, flow-limit or provides guaranteed bandwidth. The bandwidth management method can also be used in a company that requires high data transmission reliability.

In an exemplary example, a teacher who is a prioritized user with guaranteed bandwidth will not be easily interfered by a bandwidth-overusing student in a first cycle if a lower BFR is used. However, even if interference occurs, the system can still guarantee that the teacher is able to use the guaranteed bandwidth after a detection cycle. Otherwise, if the system adopts a higher BFR, the system allows the student to quickly use the unused bandwidth if the prioritized user, e.g. the teacher, is not using the network.

Figure 4:
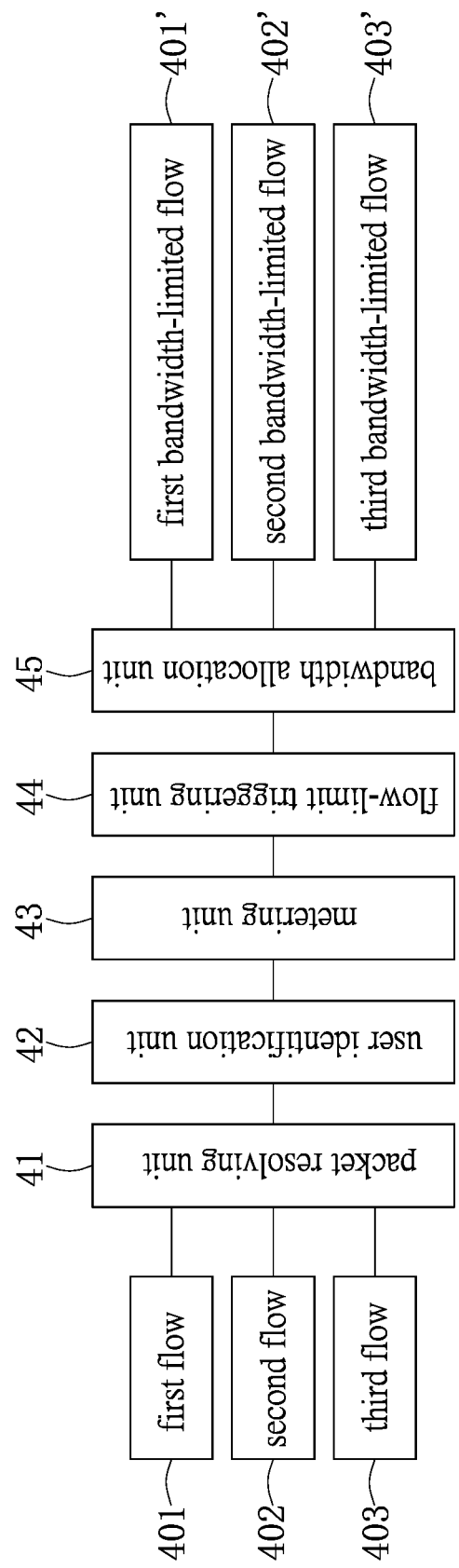
FIG. 4 shows a block diagram illustrating a network system that implements the bandwidth management method in one embodiment of the disclosure.

FIG. 4 shows functional blocks describing the network switch that embodies the bandwidth management in one embodiment of the disclosure. The network switch includes a processor and a memory. The bandwidth management method is executed by the processor inside the network switch for operating the software and hardware to provide various functions for bandwidth management. In the bandwidth management method, the network switch is capable of forwarding and metering packets of network flows, and the network system is able to resolve the headers of network packets and compare with a threshold for determining whether to trigger the flow-limit mechanism.

The network switch can forward packets of multiple flows from wired device or wireless access points. The network flows are such as a first flow 401, a second flow 402 and a third flow 403. A software-based packet resolving unit 41 is used not only to resolve packets for acquiring a packet source and destination, but also to identify user class. The source IP or MAC is provided for the system to identify the user, e.g. the user class. A user identification unit 42 is used to identify one or more connected users. In one embodiment, one or more user classes can be identified by querying a lookup table or a database inside the network system. The users can be the prioritized users with one or more classes, and the normal users. In one further embodiment, the user class assigned to the user can be dynamically changed under a specific rule. For example, a time schedule can be incorporated to assign the user classes over time.

After identifying the user class, a software-based metering unit 43 is used to meter each of the flows so as to obtain a total bandwidth used. The metering process may be done before or after a specific process. A flow-limit triggering unit 44 can directly examine the total bandwidth for triggering the flow-limit process, or alternatively with a bandwidth-usage threshold for determining whether to trigger the flow-limit process. A bandwidth allocation unit 45 is therefore used to conduct the flow-limit process that allocates the flow with respect to each user class, e.g. providing the guaranteed bandwidth for the prioritized user and limiting the bandwidth for the normal user. Reference can be made to the process described in FIG. 2.

Through the flow-limit process, the flows are finalized to be a first bandwidth-limited flow 401', a second bandwidth-limited flow 402' and a third bandwidth-limited flow 403'. The bandwidth-limited flows may include a flow with a guaranteed bandwidth and the other limited flows.

Figure 5:
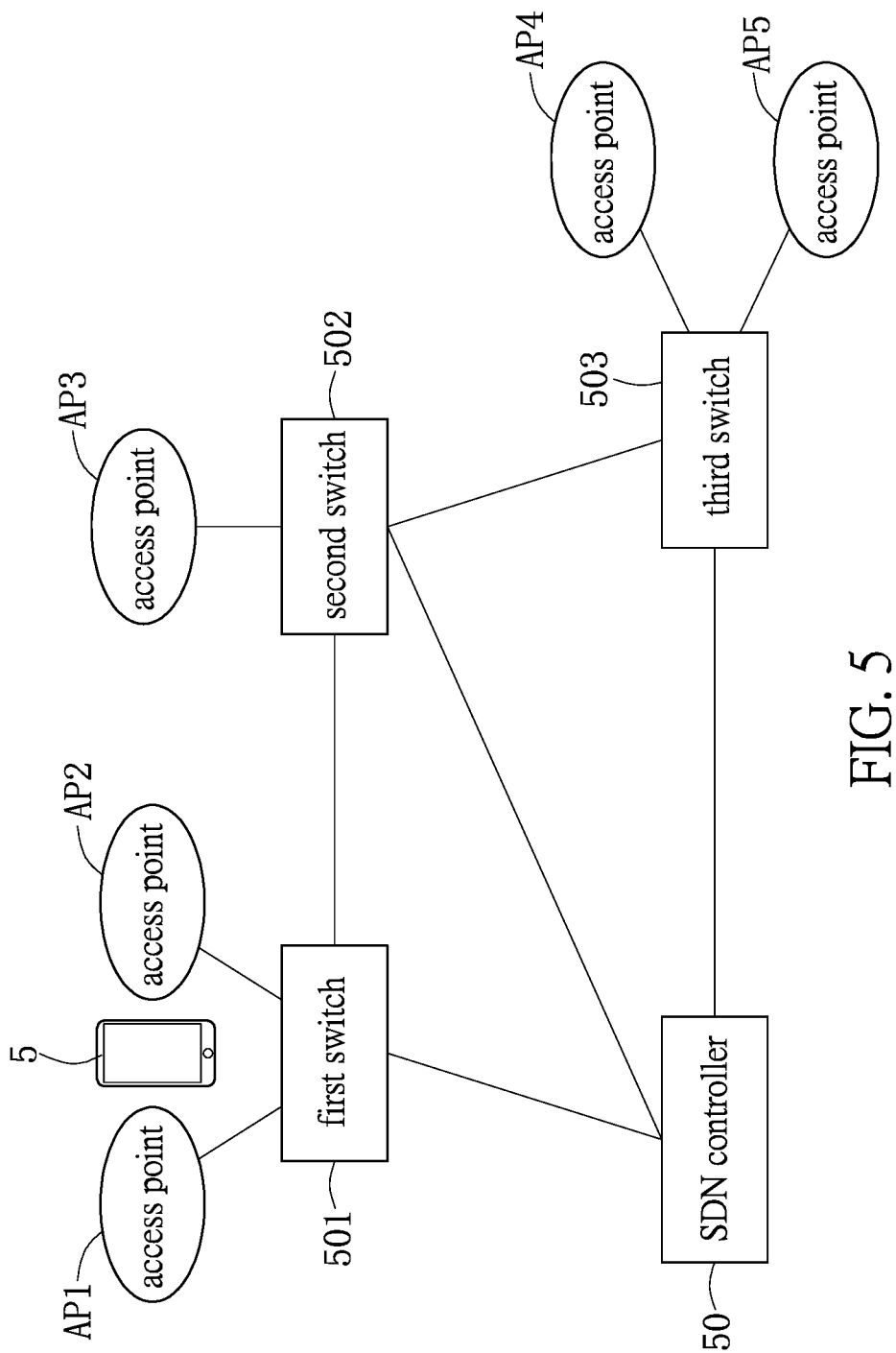
FIG. 5 shows a schematic diagram depicting the network system according to one embodiment of the disclosure.

The bandwidth management method can be implemented in a network system having one or more network switches. FIG. 5 shows a schematic diagram depicting a network system including a plurality of SDN switches 501, 502 and 503, and an SDN controller 50. The SDN controller 50 connects and manages the one or more SDN switches, e.g. a first switch 501, a second switch 502 and a third switch 503 shown in the figure. The SDN controller 50 performs the bandwidth management method. The radio coverage of the network system can be expanded through the plurality of access points AP1, AP2, AP3, AP4 and AP5 that connects with the first switch 501, the second switch 502 and the third switch 503.

In the exemplary example shown in the figure, the first switch 501 connects the access points AP1 and AP2. The access points AP1 and AP2 form two respective wireless networks ranges that are separate but that may partially overlap with each other for serving the terminal device 5. The second switch 502 connects the access point AP3 for serving a plurality of network flows within a wireless LAN. The third switch 503 connects the access points AP4 and AP5 which form two separate wireless network ranges that may partially overlap with each other. The terminal device 5 can roam among the access points AP1, AP2, AP3, AP4 and AP5 in the network system. The network flow for the terminal device 5 is under control of a bandwidth management process operated in the first switch 501, the second switch 502 and the third switch 503.

In the network system, if one or more users assigned with a specific user class use the network by the terminal device 5, the network system allows the terminal device 5 to roam over a wireless LAN covered by a radio coverage constituted by the access points AP1, AP2, AP3, AP4 and AP5 connected with the first switch 501, the second switch 502 and the third switch 503. Even if the terminal device 5 is at different locations in the LAN, the bandwidth management method operated in the first switch 501, second switch 502 and third switch 503 can still provide services of guaranteeing or limiting bandwidths.

For example, if one or more prioritized users manipulates a computer to move over the wireless LAN constituted by the access points AP1, AP2, AP3, AP4 and AP5, the network system allows a handover of the computer between the said access points in the LAN since it can identify the user and user class through the different network switches. All the network switches in the network system can serve prioritized users with the same or different guaranteed bandwidths. Each network switch performs the same procedures, such as resolving packets, identifying the users, metering flows, and triggering flow limit or bandwidth allocation processes.

Further, in another design of the network system, the bandwidth management method for the network switch provides a software-based service of dynamic adjustment to the link bandwidth according to the location where the flow is, e.g., connecting with an AP or a network switch, and related network management policies.

Figure 6:
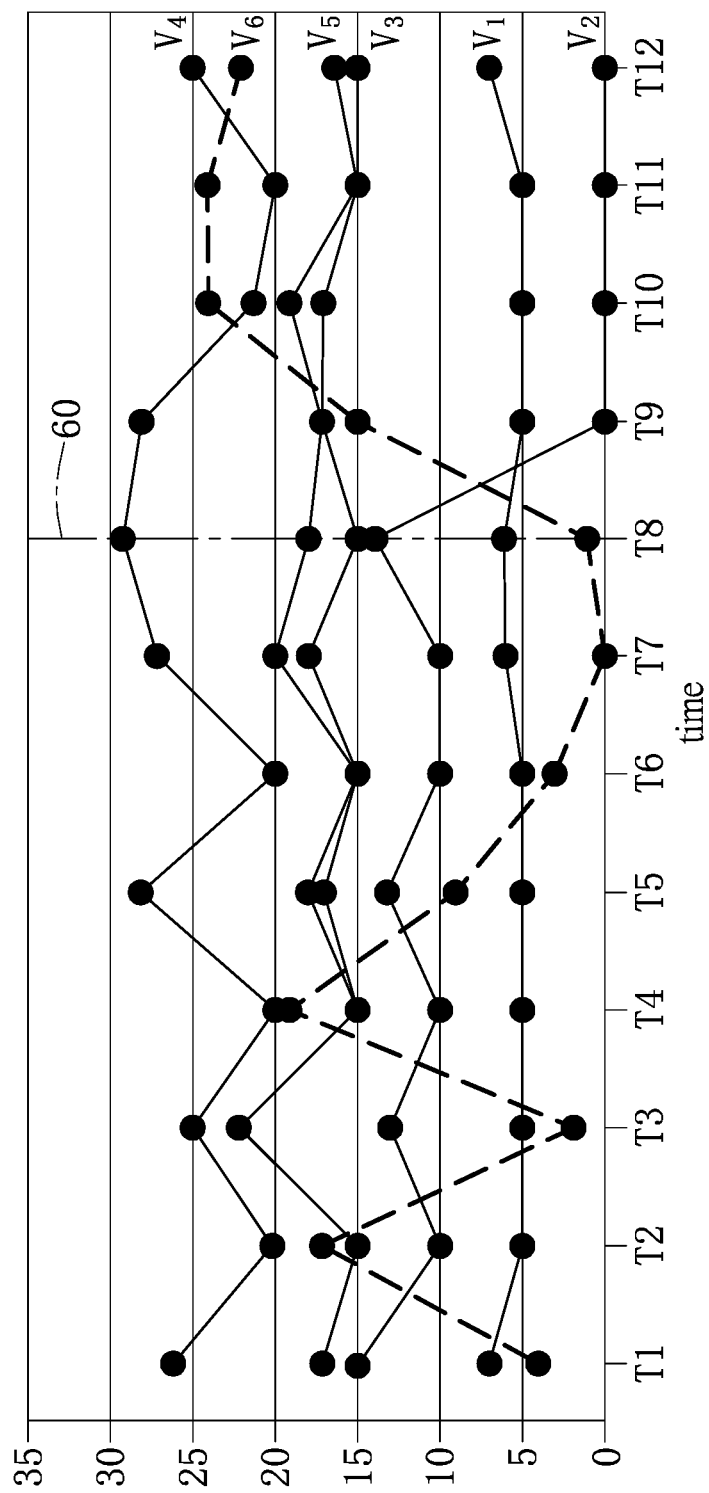
FIG. 6 shows a statistical diagram that illustrates the bandwidth usages for different classes of users when applying the bandwidth management method.

Reference is made to FIG. 6 showing a statistical histogram that depicts a distribution of bandwidth usage of several users with different user classes. The horizontal axis of the statistical diagram denotes a timeline and the vertical axis denotes usage of bandwidth. The unit of bandwidth usage is Mbps. The statistical diagram depicts bandwidth usage of the users with various user classes when operating the bandwidth management method within a total bandwidth, e.g. 100 Mbps, for a period of time.

The curves depicted in the diagram describe the bandwidth usage of the users $V_1, V_2, V_3, V_4, V_5$ and $V_6$ over time. The users $V_1, V_2, V_3, V_4$ and $V_5$ are exemplified as the prioritized users. For example, the total bandwidth (W) is 100 Mbps. The meter-triggering threshold (OMTT) is 0.85. The guaranteed bandwidths with respect to the prioritized user are respectively $V_1$=5 Mbps, $V_2$=10 Mbps, $V_3$=15 Mbps, $V_4$=20 Mbps and $V_5$=15 Mbps. The Bandwidth Flexibility Ratio (BFR) is 1.2. The available bandwidth for the normal user ($V_6$) is limited to $M_s$={0.85*100−sum(5+10+15+20+15)}*1.2=24 (Mbps).

Table one below exemplarily lists the guaranteed bandwidths for the users $V_1, V_2, V_3, V_4$ and $V_5$:

| $V_i$ | IP | Network type | guaranteed bandwidth | Limited bandwidth | Data rate |
|---|---|---|---|---|---|
| 1 | 10.10.1.2 | Internet | Yes | No | 3000 kbps |
| 2 | 10.10.2.2 | Internet | Yes | No | 3000 kbps |
| 3 | 10.10.3.2 | Internet | Yes | No | 3000 kbps |
| 4 | 10.10.4.2 | Internet | Yes | No | 3000 kbps |
| 5 | 10.10.5.2 | Internet | Yes | No | 3000 kbps |

Table one shows information related to the prioritized users, including ID ($V_i$), IP address, network type, guaranteed bandwidth, and the data rate.

For example, as shown by table one, the guaranteed bandwidth for the user $V_1$ is 5 Mbps, and the curve ($V_1$) shows that the whole time-based utilized bandwidth of the user $V_1$ is not less than 5 Mbps. Further, the guaranteed bandwidth for the user $V_2$ is 10 Mbps. The curve ($V_2$) shows that the utilized bandwidth has been over 10 Mbps before a reference timing 60, and appears to be offline without traffic after triggering the flow-limit process. The flow-limit process may also cause the total bandwidth usage of the prioritized users to decline. The guaranteed bandwidth for the user $V_3$ is 15 Mbps, and the curve ($V_3$) shows that the bandwidth usage is always maintained above the guaranteed bandwidth. The guaranteed bandwidth for the user $V_4$ is 20 Mbps, and the curve ($V_4$) shows that the bandwidth usage is mostly maintained between 20 Mbps and 30 Mbps. The guaranteed bandwidth for the user V5 is 15 Mbps, and the curve ($V_5$) shows that the total bandwidth usage is always maintained around the guaranteed bandwidth.

According to the example shown in the diagram, the formula (1) is used to calculate an available bandwidth ($M_s$), e.g. 24 Mbps, allowing a normal user to exceed his limited bandwidth. The curve ($V_6$) shows that the available bandwidth for the normal user $V_6$ is limited by the bandwidth usage of the prioritized users and their guaranteed bandwidths. However, when the bandwidth usage of the user $V_2$ is reduced to zero after the reference timing 60, the normal user $V_6$ can flexibly exceed his limited usage, but still be limited by the available bandwidth ($M_s$). After that, if the user $V_2$ again starts using his guaranteed bandwidth, the amount of the bandwidth usage for other users will be returned to the state conforming to the rules after a detection cycle.

Therefore, when the bandwidth usage of the plurality of prioritized users ($V_1$, $V_2$, $V_3$, $V_4$, $V_5$) begins to maintain at a high load beyond their total guaranteed bandwidth, the bandwidth provided for the normal user ($V_6$) is limited. Otherwise, under the circumstance that the bandwidth usage for the normal user ($V_6$) exceeds his limited bandwidth, if one or more prioritized users ($V_1$, $V_2$, $V_3$, $V_4$, $V_5$) starts using the bandwidth, the system can trigger the flow-limit process for adjusting the bandwidth usage after a detection cycle.

According to the bandwidth management method for the network switch, the network system automatically conducts an on-demand metering when the bandwidth usage is maintained at a high load. The system will restrict the bandwidth usage for allowing fair use of the bandwidth, including providing the guaranteed bandwidth for the prioritized users who may be paid users or users with premium access. The available bandwidth provided for the normal user may be dynamically changed based on the bandwidth usage of the prioritized users. Even though the normal user can exceed his limit when using the bandwidth, the bandwidth usage for the normal user is still limited by the available bandwidth ($M_s$).

In summation, according to the embodiments of the bandwidth management method operated in the network switch, the bandwidth provided for the user will not be intervened if the bandwidth is sufficient for all the users, but the bandwidth of a flow shall be re-allocated if the total bandwidth is insufficient for guaranteeing the bandwidth for the prioritized users, e.g. a teacher's bandwidth. The method requires the system to set up the various classes of prioritized users, the number of the prioritized users and their guaranteed bandwidths. The counter inside the switch is used to measure the flow rate that is used to trigger the flow-limit process or to guarantee the bandwidths for the prioritized users.

It is intended that the specification and depicted embodiments be considered exemplary only, with a true scope of the invention being determined by the broad meaning of the following claims.

What is claimed is:

1. A bandwidth management method for a network switch, comprising:
   metering a total bandwidth usage of packets;
   determining if the total bandwidth usage reaches a threshold for triggering a flow-limit process, which is a bandwidth-usage threshold that is equal to a total bandwidth multiplied by a meter-triggering threshold;
   if the total bandwidth usage reaches the threshold, triggering the flow-limit process including:
   identifying a user class with respect to a utilized bandwidth;
   if the user class is a prioritized user, providing a guaranteed bandwidth; if the user class is a normal user, performing a normal user flow-limit that restricts the normal user to use the bandwidth aside from the guaranteed bandwidth for one or more prioritized users, wherein the normal user flow-limit is to restrict a flow provided for the normal user within an excess available bandwidth, and the excess available bandwidth is equal to the normal user's total available bandwidth multiplied by a Bandwidth Flexibility Ratio; and
   not intervening in usage of bandwidth if the total bandwidth usage does not reach the threshold.

2. The method as recited in claim 1, wherein the method is performed in an SDN (Software-Defined Network) controller that is connected with one or more SDN switches.

3. The method as recited in claim 1, wherein the packets are resolved to obtain information for identifying a user class, and one or more user classes are identified by querying a lookup table or a database.

4. The method as recited in claim 1, wherein the meter-triggering threshold is equal to or smaller than 1.

5. The method as recited in claim 1, wherein the normal user's total available bandwidth is equal to a bandwidth obtained by subtracting all prioritized users' guaranteed bandwidth from the bandwidth-usage threshold.

6. The method as recited in claim 1, wherein the Bandwidth Flexibility Ratio is larger than or equal to 1.

7. The method as recited in claim 1, wherein the method is performed periodically.

8. A network system performing a bandwidth management method in a network switch, wherein the network system comprises:
   a network switch including a processor and a memory, wherein the processor performs the bandwidth management method including:
   metering a total bandwidth usage of packets;
   determining if the total bandwidth usage reaches a threshold for triggering a flow-limit process, which is a bandwidth-usage threshold that is equal to a total bandwidth multiplied by a meter-triggering threshold;

if the total bandwidth usage reaches the threshold, triggering the flow-limit process including:

identifying a user class with respect to a utilized bandwidth;

if the user class is a prioritized user, providing a guaranteed bandwidth; if the user class is a normal user, performing a normal user flow-limit that restricts the normal user to use the bandwidth aside from the guaranteed bandwidth for one or more prioritized users, wherein the normal user flow-limit is to restrict a flow provided for the normal user within an excess available bandwidth, and the excess available bandwidth is equal to the normal user's total available bandwidth multiplied by a Bandwidth Flexibility Ratio; and not intervening in usage of bandwidth if the total bandwidth usage does not reach the threshold.

9. The system as recited in claim 8, wherein the network switch is an SDN (Software-Defined Network) switch, and the bandwidth management method is performed in an SDN controller that is connected with one or more SDN switches.

10. The system as recited in claim 9, wherein each of the SDN switches serves network flows within a wireless LAN (Local Area Network) through one or more APs (Access Points).

11. The system as recited in claim 10, wherein a network system formed by the SDN switches and one or more APs connected with each of the switches provides a guaranteed bandwidth or a limited bandwidth for a terminal device that roams over the network system at different locations.

12. The system as recited in claim 8, wherein the network switch is combined with a server that operates DHCP (Dynamic Host Configuration Protocol) or RADIUS (Remote Authentication Dial In User Service).

13. The system as recited in claim 8, wherein the packets are resolved to obtain information for identifying a user class, and one or more user classes are identified by querying a lookup table or a database.

14. The system as recited in claim 8, wherein the normal user's total available bandwidth is equal to a bandwidth obtained by subtracting all prioritized users' guaranteed bandwidth from the bandwidth-usage threshold.

* * * * *